Patented Dec. 22, 1953

2,663,727

UNITED STATES PATENT OFFICE 2,663,727

DIASTEREOISOMERIC PROPANE DERIVATIVES AND PROCESS FOR THEIR MANUFACTURE

Paul Gailliot, Paris, and Jean Robert, Maisons Laffitte, France, assignors, by mesne assignments, to Parke, Davis & Company, Detroit, Mich., a corporation of Michigan No Drawing. Application February 23, 1951, Serial No. 212,491

Claims priority, application France October 28, 1950

7 Claims. (Cl. 260—477)

1

This invention relates to a process for preparing certain diastereoisomeric propane derivatives.

By analogy with the nomenclature adopted by Rebstock et al. (J. A. C. S., vol. 71, pp. 2458–2473) in connection with the iastereoisomeric amido diol, 2-dichloracetamido-1-p-nitrophenylpropane 1:3-diol, an optically active isomer of which is known by the common name "Chloramphenicol," structural isomeric forms are herein referred to as "erythro" and "threo" respectively while the racemic mixture and individual optical isomers corresponding to each of these structural isomeric forms are designated DL, L and D respectively. Configurational representation of the isomers as D and L refers not to actual sign of rotation but to configuration about the alpha carbon atom. Thus the D-threo compounds hereinafter referred to have the same configuration with respect to the alpha carbon atom as the therapeutically active isomer of chloramphenicol which has been designated D(-)-threo 2-dichloracetamido-1-p-nitrophenylpropane 1:3-diol.

The compounds prepared by the process of the present invention are the racemic and optically isomeric threo esters of 2-dichloracetamido-1-p-nitrophenyl-1-chloro-3 - hydroxypropane represented by the conventional formula:

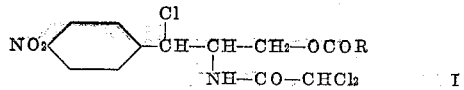

I in which R represents an unsubstituted or substituted aliphatic or aromatic radical or an alkoxy group. These compounds are disclosed and claimed in the co-pending application of Jacob and Robert, Serial No. 212,489, filed on even date herewith. In one embodiment under the above formula, the radical R represents a lower alkyl group or a phenyl group. In another embodiment, the radical —OCOR is derived from a dibasic carboxylic acid, such as succinic acid, and, therefore, R then has the form —R'COOR" where R' represents an alkylene or arylene group and R" represents hydrogen or an alkyl group.

According to this invention, these new compounds are obtained from the corresponding threo esters represented by the general formula:

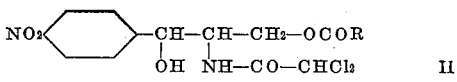

II (where R is as hereinbefore defined) by treatment with thionyl chloride under anhydrous conditions.

2

The esters of Formula II employed as starting materials may be obtained, for example, by the action of carboxylic acid chlorides or anhydrides or, in certain cases, of chloro carbonic esters, in the presence of a tertiary base, upon threo 2 - dichloroacetamido-1-p-nitrophenylpropane 1:3-diols.

It will be appreciated that since the starting material used in the production of the compounds of the present invention can exist in optically isomeric forms, it is necessary, if a particular optical isomer of the final product is to be obtained either to use the starting material in the form of the corresponding isomer or to resolve the racemate produced in the processes hereinbefore described.

The DL and D-threo esters of 2-dichloracetamido-1-p-nitrophenyl-1 - chloro - 3 - hydroxypropane of the present invention are important intermediates for the preparation of chloramphenicol and the corresponding DL form thereof and also for the preparation of the useful oxazolines D and DL-threo 2-dichloromethyl-5-p-nitrophenyl-4-hydroxymethyl-$\Delta^2$ - oxazolines, as disclosed and claimed in the co-pending application of Jacob and Robert, Serial No. 212,490, filed on even date herewith.

The following, non-limitative examples illustrate the invention:

Example I

To a solution of 12 g. of racemic threo 2-dichloracetamido-1 - p - nitrophenyl - 3 - acetoxypropane 1-ol of M. P. 132–133° C. in 20 c. c. of anhydrous dioxane and 2.6 g. of anhydrous pyridine, are added, with agitation and cooling, 4 g. of pure thionyl chloride (distilled over linseed oil). The mixture is heated in an oil bath (80°–90° C.) for 40 minutes whereafter the dioxane is distilled off in vacuo in the cold. The residue is re-dissolved in 70 c. c. of chloroform, and the solution is washed with water, dried over sodium sulphate and decolourised with charcoal. The chloroform is distilled off in vacuo in the cold until the residue is dry. By recrystallisation of the residue from 45 c. c. of benzene, 10.7 g. of racemic threo - 2 - dichloracetamido-1-p-nitrophenyl-1-chloro-3-acetoxy-propane, M. P. 118–119° C., are obtained. A second crystallisation raises the melting point to 120–121° C.

Example II

To a solution of 14.7 g. of D-threo 2-dichloracetamido-1-p-nitrophenyl-3 - acetoxy - propane 1-ol in 30 c. c. of anhydrous dioxane and 3.48 g. of anhydrous pyridine, are added, with agitation and cooling, 5.25 g. of pure thionyl chloride (distilled over linseed oil). The mixture is then heated in a bath at 90–100° C. for 40 minutes and the dioxane distilled off in vacuo in the cold. The oily residue is redissolved in 80 c. c. of chloroform, and the chloroform solution is washed with water, dried over sodium sulphate and decolourised with charcoal. The chloroform is driven off in vacuo in the cold. 16.5 g. of D-threo 2-di-dichloracetamido-1-p-nitrophenyl-1 - chloro - 3-acetoxypropane are obtained which, after recrystallisation from ethyl alcohol, melt at 101–102°C., and has a rotatory power of $(a)_D^{20} = -8°$ ($c=6.4\%$ in ethyl acetate).

*Example III*

To a solution of 4 g. of D-threo 2-dichloracetamido-1-p-nitrophenyl-3 - benzoyloxy - propane 1-ol of M. P. 199–200° C. and $(a)_D^{20}=29.3°$ ($c=4\%$ in acetone) in 50 c. c. of anhydrous dioxane and 0.82 g. of anhydrous pyridine, are added, with agitation and cooling, 1.22 g. of pure thionyl chloride (distilled over linseed oil). The product is then heated to 85–90° C. for 50 minutes, and the dioxane is then distilled off in vacuo in the cold. The residue is taken up in 50 c. c. of chloroform and the solution washed with water, dried over sodium sulphate and decolourised with charcoal. The chloroform is removed in vacuo. 4 g. of D-threo 2-dichloracetamido-1-p-nitrophenyl-1-chloro-3-benzoyloxypropane are obtained; M. P. 107–109° C.

After recrystallisation from ethyl alcohol, the product melts at 109–110° C., $(a)_D^{20}=-8°$ ($c=4\%$ in ethyl acetate).

We claim:

1. Process comprising heating a threo compound of formula

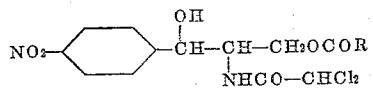

with thionyl chloride under anhydrous conditions and in the presence of a solvent at a temperature of 80–100° C., thereby producing a threo compound of formula

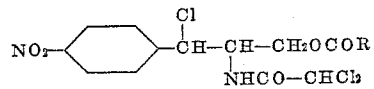

wherein R is a radical of the class consisting of lower alkyl and phenyl groups.

2. Process according to claim 1 wherein an excess of thionyl chloride is employed, the reagents are refluxed together in a solvent medium until the reaction is substantially complete and the excess thionyl chloride and solvent removed by distillation under reduced pressure.

3. Process which comprises heating DL-threo-1 - p - nitrophenyl - 2 - dichloracetamido - 3 - acetoxypropane - 1 - ol with thionyl chloride under anhydrous conditions and in the presence of a solvent at a temperature of 80–100° C., thereby producing DL-threo-1-p-nitrophenyl-1-chloro-2-dichloracetamido - 3 - acetoxypropane.

4. Process which comprises heating D-threo-1 - p - nitrophenyl - 2 - dichloracetamido - 3 - acetoxypropane-1-ol with thionyl chloride under anhydrous conditions and in the presence of a solvent at a temperature of 80–100° C., thereby producing D-threo-1-p-nitrophenyl-1-chloro-2-dichloracetamido-3-acetoxypropane.

5. Process comprising refluxing at a temperature of 80–100° C. DL-threo-1-p-nitrophenyl-2-dichloracetamido-3-acetoxypropane-1-ol with an excess of thionyl chloride in an anhydrous solvent medium until the reaction is substantially complete and the excess thionyl chloride and solvent removed by distillation under reduced pressure thereby obtaining DL-threo-1-p-nitrophenyl-1-chloro-2-dichloracetamido-3-acetoxypropane.

6. Process comprising refluxing at a temperature of 80–100° C. D-threo-1-p-nitrophenyl-2-dichloracetamido-3-acetoxypropane-1-ol with an excess of thionyl chloride in an anhydrous solvent medium until the reaction is substantially complete and the excess thionyl chloride and solvent removed by distillation under reduced pressure thereby obtaining D-threo-1-p-nitrophenyl-1 - chloro-2-dichloracetamido-3-acetoxypropane.

7. Process comprising refluxing at a temperature of 80–100° C. D-threo-1-p-nitrophenyl-2-dichloracetamido-3-benzoyloxypropane-1-ol with an excess of thionyl chloride in an anhydrous solvent medium until the reaction is substantially complete and the excess thionyl chloride and solvent removed by distillation under reduced pressure thereby obtaining D-threo-1-p-nitrophenyl-1 - chloro-2-dichloracetamido-3-benzoyloxy propane.

PAUL GAILLOT.
JEAN ROBERT.

References Cited in the file of this patent

UNITED STATES PATENTS

| Number | Name | Date |
|---|---|---|
| 2,513,346 | Moersch et al. | July 4, 1950 |
| 2,562,114 | Moersch et al. | July 24, 1951 |
| 2,587,641 | Moersch et al. | May 4, 1952 |